United States Patent [19]
Hotier et al.

[11] Patent Number: 5,578,216
[45] Date of Patent: Nov. 26, 1996

[54] CHROMATOGRAPHIC SIMULATED MOBILE BED SEPARATION PROCESS WITH DEAD VOLUME CORRECTION USING LENGTH REDUCTION

[75] Inventors: Gérard Hotier, Rueil Malmaison; Choua Cohen; Nicolas Couenne, both of Lyons; Roger-Marc Nicoud, Richardmesnil, all of France

[73] Assignees: Institut Francais Du Petrole, Rueil Malmaison; Separex, Champigneulles, both of France

[21] Appl. No.: 494,568

[22] Filed: Jun. 22, 1995

[30] Foreign Application Priority Data

Jun. 22, 1994 [FR] France ................................. 94 07764

[51] Int. Cl.$^6$ .................................................. B01D 15/08
[52] U.S. Cl. ........................................ 210/659; 210/198.2
[58] Field of Search ................................ 210/635, 656, 210/659, 662, 198.2; 127/46.1, 46.2

[56] References Cited

U.S. PATENT DOCUMENTS

| | | | |
|---|---|---|---|
| 4,402,832 | 9/1983 | Gerhold | 210/659 |
| 4,498,991 | 2/1985 | Oroskar | 210/659 |
| 4,724,081 | 2/1988 | Kawahara | 210/198.2 |
| 4,970,002 | 11/1990 | Ando | 210/659 |
| 4,990,259 | 2/1991 | Kearey | 210/659 |
| 5,064,539 | 11/1991 | Tanimura | 210/659 |
| 5,093,004 | 3/1992 | Hotier | 210/659 |
| 5,114,590 | 5/1992 | Hotier | 210/659 |
| 5,422,007 | 6/1995 | Nicoud | 210/659 |
| 5,470,464 | 11/1995 | Priegnitz | 210/659 |

FOREIGN PATENT DOCUMENTS

| | | | |
|---|---|---|---|
| 0415821 | 3/1991 | European Pat. Off. | 210/198.2 |
| 84/02854 | 8/1984 | WIPO | 210/198.2 |
| 90/06796 | 6/1990 | WIPO | 210/198.2 |

*Primary Examiner*—Ernest G. Therkorn
*Attorney, Agent, or Firm*—Millen, White, Zelano, & Branigan, P.C.

[57] ABSTRACT

In a simulated mobile bed separation process, perturbations are corrected in the compositions of an extract (EA) or raffinate (RB) due to the dead volume introduced by at least one recycling pump (P) or compressor for a liquid, supercritical or gaseous mixture in a closed circuit of column sections. The volume of the section immediately upstream of the dead volume is reduced by an appropriate value when said dead volume is located downstream of this section and upstream of the extraction streams of said section, or the volume of the section immediately downstream of the dead volume is reduced by an appropriate value when the dead volume is located downstream of the injection streams into said section and upstream of this section.

The invention is applicable to the separation of isomers of aromatic hydrocarbons containing 8 carbon atoms.

8 Claims, 4 Drawing Sheets

FIG.3

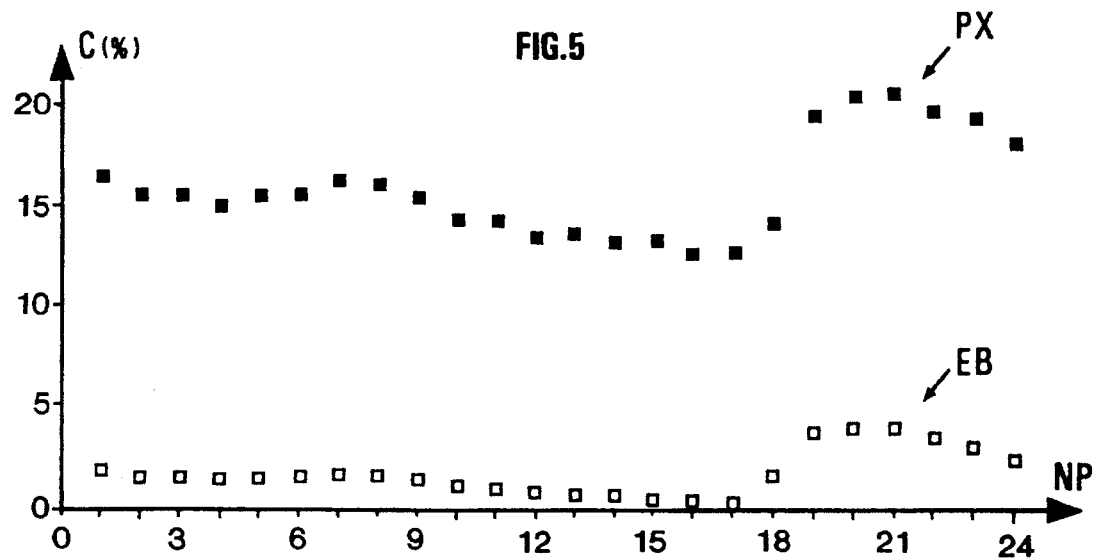
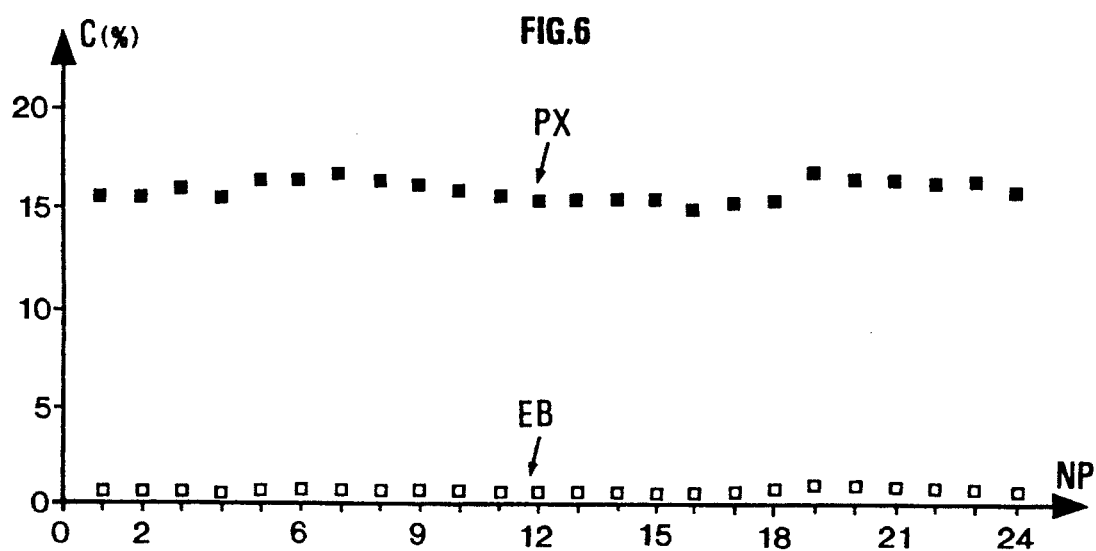

CHROMATOGRAPHIC SIMULATED MOBILE BED SEPARATION PROCESS WITH DEAD VOLUME CORRECTION USING LENGTH REDUCTION

The present invention concerns a process for the fractionation of fluid mixtures of components using a chromatographic method.

It is particularly applicable to the separation of aromatic hydrocarbons containing eight carbon atoms.

Chromatography is based on the fact that certain porous solids, in the presence of liquid, gaseous or supercritical mixtures, can retain the different constituents of the mixture to a greater or lesser extent.

Separation processes based on chromatography are usually operated as follows: the porous solid, of known granulometry, is contained in a generally cylindrical receptacle, the column; this constitutes the stationary phase. The mixture to be separated is percolated through the column, and the constituents arrange themselves successively depending on the extent to which they are retained by the stationary phase.

The prior art is illustrated in European patent EP-A-0 415 821, and International patents WO-A-84 02854 and WO-A-90 06796.

The separation process of this invention is simulated mobile bed chromatographic separation, in counter-current or co-current mode, such as that described in particular in United States patents U.S. Pat. Nos. 2,985,589, 4,402,832 and 4,498,991.

BRIEF DESCRIPTION OF THE DRAWINGS

The invention is illustrated in the accompanying figures, in which:

FIG. 5 shows variations in the average composition C (weight %) of the extract for each period in the cycle as a function of the period number NP in the cycle, without compensation for the dead volume; and FIG. 6 shows variations in the average composition C (weight %) of the extract for each period in the cycle as a function of the period number NP in the cycle, with the compensation of the invention applied.

DESCRIPTION OF THE PREFERRED EMBODIMENTS

One way of explaining the operation of a simulated mobile bed chromatographic separation process consists of representing it by an equivalent real counter-current process.

Figure 1:
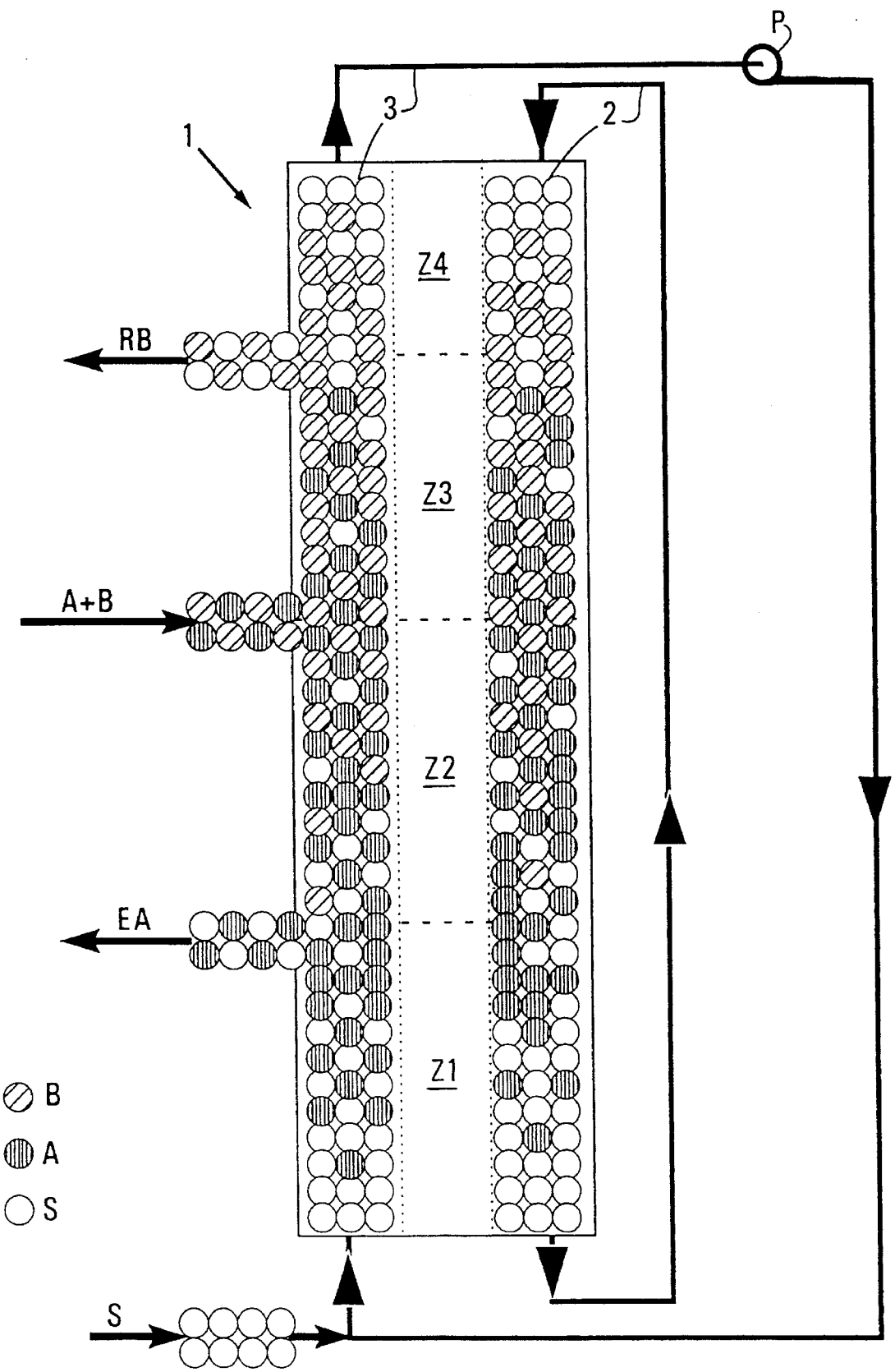
FIG. 1 shows the principle of real counter-current separation.

In the real counter-current process represented in FIG. 1 and containing four zones Z1, Z2, Z3 and Z4, a fixed and constant concentration profile develops in separation column 1, where the positions of injection points for a feed A+B and an eluent S, and of extraction points for an extract EA and a raffinate RB remain fixed, while the solid adsorbent 2 and liquid 3 displace counter-current to each other. In this process, recycling pump P returns liquid from a high point to a low point in the column, while a mobile bed system, for example, returns the solid from the low point to the high point. These two systems contain a point where the only species present in the concentration profile in both the liquid and the solid is the eluting eluent. This point is at the junction of zones I and IV (see FIG. 1). In this situation, the volumes of liquid and solid engaged in the recycling systems are of no real interest since only one species is present and backmixing effects are of no consequence.

The success of simulated mobile bed chromatographic separation processes leans on the difficulty of correctly circulating a solid without causing attrition and without considerably increasing the porosity of the bed compared with a fixed bed. In simulated mobile bed processes, the solid is located in a number n of fixed beds, n generally being between four and twenty-four. The major difference between real counter-current processes and simulated mobile bed processes is due to the fact that in the latter, the concentration profile is no longer fixed but displaces at a uniform rate around a closed circuit constituted by n fixed beds or chromatographic columns disposed in a series where the outlet to the $n^{th}$ fixed bed is connected to inlet to the first bed.

Two cases of simulated mobile bed processes must be considered, differing in the manner in which the recycling pump (for liquids and supercritical fluids which are dense enough to pump) or a recycling compressor (for gases and non pumpable supercritical fluids) which circulate the liquid in the circuit of n fixed beds:

A) In a first case, each fixed bed is contained in an individual column and the recycling pump can be displaced from one column junction to the next at the same rate as that of the fluid injection and extraction points. In this case (as described in U.S. Pat. No. 5,093,004 and WO 93/22022), the volume of the line bringing the fluid from the outlet to one column to the recycling pump inlet, the volume of the pump itself and the volume of the line bringing the fluid from the pump outlet to the inlet to the following column (the total of these three terms constituting the volume of the recycling circuit) are, as in the case of real counter-current separation, of no consequence since these volumes are designed to be occupied exclusively by pure eluent.

Figure 2:
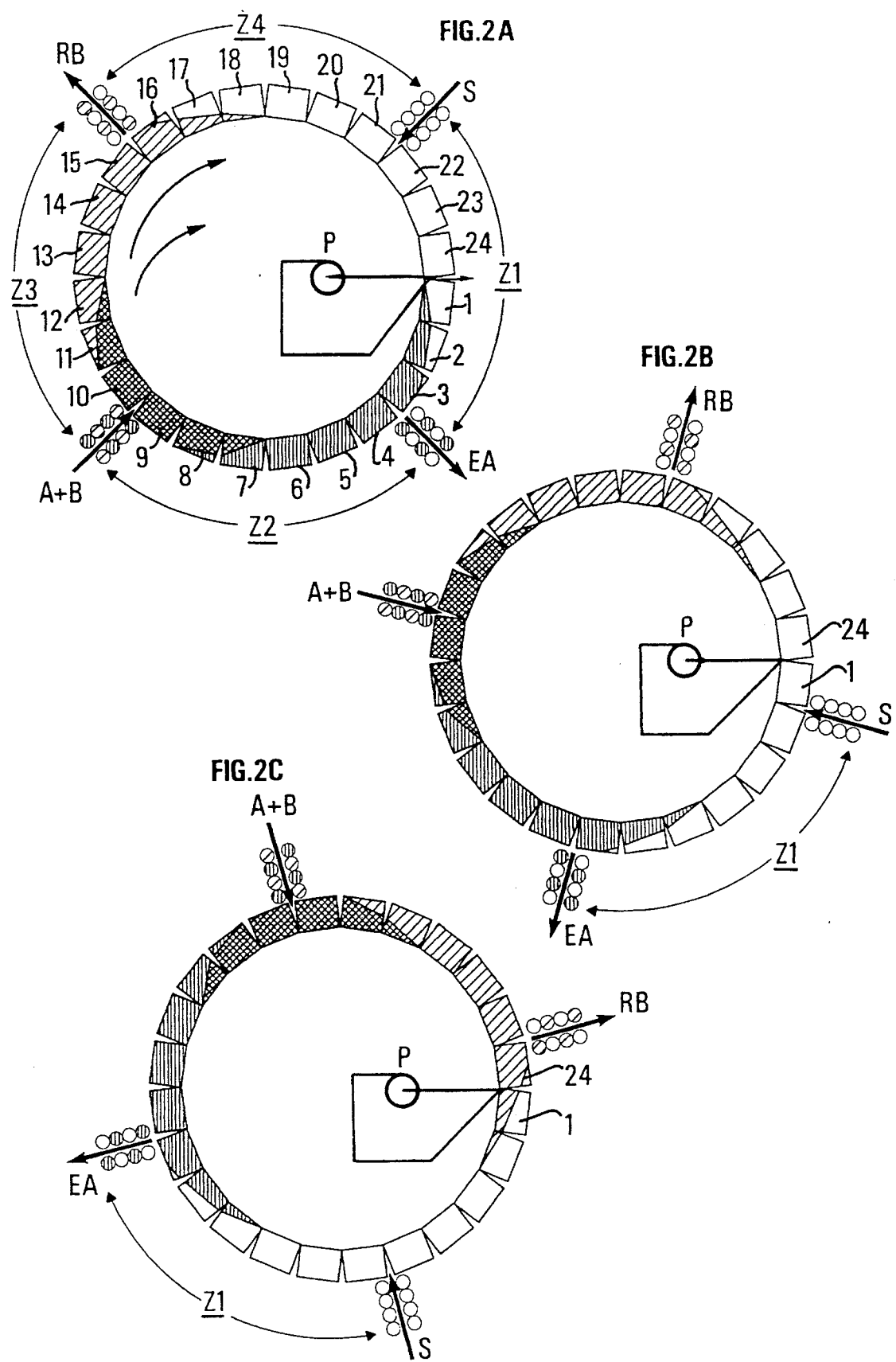
FIGS. 2A, 2B, 2C show the operation of simulated counter-current separation.

B) In a second case, each fixed bed or chromatographic column section is connected to the next by a line which can only go to the next bed (in particular when several fixed beds are located in the same column) except for the $n^{th}$ whose outlet is connected to the inlet of the recycling pump P, the outlet of said pump P being connected to the first of the fixed beds (see FIG. 2). Naturally, the numbering of these column sections is purely arbitrary; by convention, the first is considered to be the section with its inlet connected to the recycling pump outlet and the last or $n^{th}$ has its outlet connected to the inlet of the pump. In this case, the recycling pump will pass all of the concentration profiles. The dead volume of the pump creates an anisotropy in the volume of the $n^{th}$ fixed bed compared with the others and causes a perturbation in the compositions of the extract and raffinate, reducing the purity and the yield. In general, in order to minimise the total dead volume in the circuit, the junction lines between the different columns are all designed to have the same volume, this volume being reduced to the minimum volume possible. When the fluid in the system is a gas recycled by a compressor, the observed perturbation is much lower than that obtained in the case of a liquid or a pumpable supercritical fluid.

For gases at low pressure, the perturbation is negligible.

For simplicity, the unit can be represented as an ensemble of segments which desirably should all be of the same length L (these segments symbolise the column sections). However, we are obliged to add a length l (l symbolises the dead volume of the recycling circuit) to one of the segments. When the unit is operating, a point displaces along these segments with a constant speed u. The point requires a time $\theta$ to traverse the ensemble of the n segments and the operation is optimised when the segment junctions are crossed in a synchronised manner at times which are multiples of $\theta/n$. In the ideal case (n segments of length L), $T=\theta/n =L/u$; in a real case, T and $\theta$ are fixed by ignoring l. The total length to be traversed is no longer n.L but n.L +l; during each period T, the point traverses a distance L+l/n, but it should traverse a distance L for the first n−1 periods and L+l for the last period. Passage of the point across the segment junctions is no longer synchronised to multiples of T but is only synchronised for each multiple of $\theta$. L, l and u respectively can be obtained by dividing the volume V of each of the sections, the dead volume v of the recycling circuit and the flow rate Di in the sections by the cross section of the sections.

Figure 4:
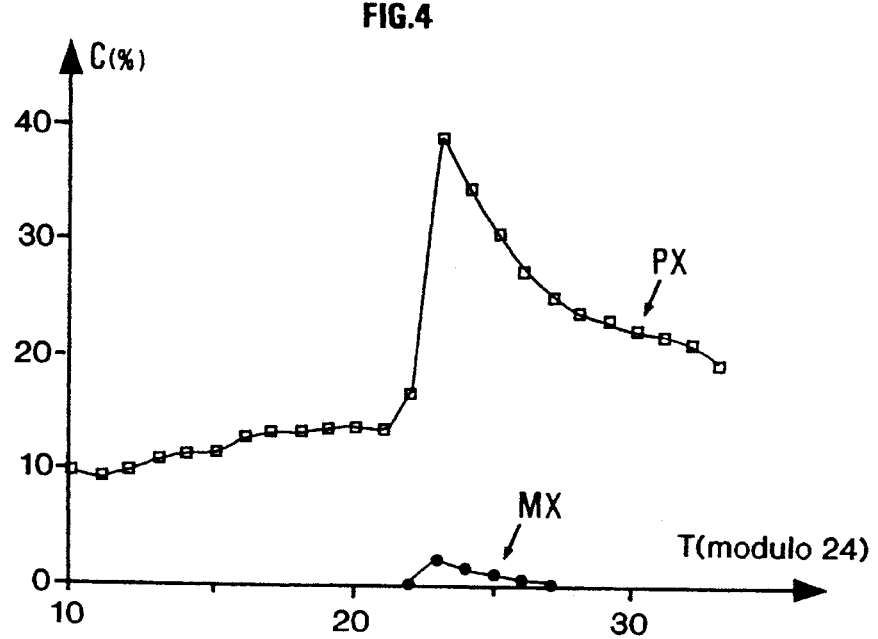
FIG. 4 shows variations in the composition C (weight %) of samples of extract taken at the same instant in each period T of the cycle as a function of the period number in the cycle (modulo 24)

FIG. 4 shows an example of the perturbation caused by the volume of the recycling circuit on the instantaneous composition of the extract taken at the same moment in each period, period by period, in a simulated mobile bed with 4 zones and 24 sections. If several successive cycles are observed, the perturbation is seen to have a periodicity of 24 periods, i.e., 1 cycle (Proceedings of the 9th International Symposium on Preparative Chromatography, Nancy, April 1992, Balannec-Hotier).

Further, French patent application 94/05293 describes a simulated mobile bed separation process with a constant recycle flow rate where the recycling pump has its inlet connected to the $n^{th}$ fixed bed and its outlet connected to the first fixed bed. Thus the ensemble of the concentration profiles pass through it. The introduction and extraction circuits in the chromatographic system are independently shifted and there is no longer a unique shift period but a table $[T_j^i]$ of shift times whose calculation is based on the fact that the eluted volume at the outlet to each zone must be constant and equivalent to that of an equivalent conventional simulated mobile bed, such that $$V_k D_k T = D_k^P \cdot [T_{i+1}^j - T_i^{j-1}]$$

where

Dk represents the flow rate in zone k in the conventional simulated mobile bed;

T represents the shift period of the conventional simulated mobile bed;

$D_k^P$ represents the flow rate in zone k in the simulated mobile bed with a constant recycle flow rate when the pump is in zone p;

$T_{i+1}^j$ represents the instant where the flux removed or introduced shifts from the outlet to the $j^{th}$ section to the outlet to the following section, where:

j is the number of the section immediately preceding the injection or extraction point;

i is the number of times the slowest of the z circuits has already shifted since the start of the cycle.

In practice this type of system behaves exactly like a conventional simulated mobile bed and exhibits the same perturbations in the compositions of the extract and raffinate due to the dead volume of the recycling circuit which introduces an anisotropy in the volume of the $n^{th}$ bed or column section compared with that of the other column sections.

A first object of the invention, when the mixture is a liquid or a pumpable supercritical fluid, is to overcome the perturbation in the composition of both the extract and raffinate caused by the dead volume in the recycling pump located between the $n^{th}$ and the first bed A second object of the invention, when the mixture is a pressurized gas or a less dense supercritical fluid, is to overcome the perturbation in the composition of both the extract and raffinate caused by the dead volume o in the recycling compressor located between the $n^{th}$ and the first bed.

More generally, the object of the invention is to overcome perturbations in the composition of both the extract and the raffinate caused by the dead volumes of the various apparatus located between two consecutive beds of the circuit.

More precisely, the invention concerns a process for the simulated mobile bed separation of a feed containing at least two constituents in the presence of at least one eluent into at least two fractions, the simulated mobile bed comprising n, advantageously 4 to 24, chromatographic columns or column sections mounted in series and in a closed circuit, in which a liquid, supercritical or gaseous mixture circulates under pressure, the circuit having at least one feed injection stream, at least one eluent injection stream, at least one extract extraction stream and at least one raffinate extraction stream, at least four zones being determined in said columns, each zone being separated from the following zone by an injection or extraction stream, the injection and extraction streams being periodically shifted, the closed circuit comprising a recycling pump for said mixture, which is flow rate regulated and located between two successive columns or column sections, optionally at least one measuring or sampling means and optionally at least one recycling pump which is pressure regulated, said measuring or sampling means and/or pressure regulated recycling pump each being located between two consecutive columns or column sections, said pumps and/or measuring or sampling means each having a dead volume in the recycling circuit which causes perturbations in the extract and in the raffinate composition, the process being characterised in that the volume of the section immediately upstream of said dead volume is reduced by an appropriate value when the dead volume is located downstream of said section and upstream of the extraction streams of said section, or the volume of the section immediately downstream of said dead volume is reduced by an appropriate value when the dead volume is located downstream of the injection streams into said section and upstream of said section.

The term "recycling pump" must be taken in its generic sense as a circulation means, i.e., a pump in the case of a pumpable liquid or supercritical mixture, and a compressor in the case of a pressurized gaseous mixture or a less dense supercritical mixture.

For convenience, the flow rate regulated recycling pump is considered, for example, to be arbitrarily located between columns n and 1. Using the schematisation described above, the problem thus consists of re-establishing a situation such that the point arrives at the end of each segment at the end of each period in the cycle with a total cycle time of $\theta$. The proposed means consists of shortening the $n^{th}$ segment by a length "1" to which 1 is required to be added, to compensate for the delay introduced by this length. Letting εb be the sum of the intergrain (or bed) and grain porosities, εb is expressed as a volume fraction of a column section. A non adsorbed constituent displaces in the first (n−1) sections in successive volumes of $\epsilon b.V$; the $n^{th}$ section must therefore have a volume V' such that $\epsilon b.V = \epsilon b.V' + v$ to retain the same traverse time θ, i.e., $$V' = V - v/\epsilon b.$$

Letting Ca be the adsorption capacity of the fixed phase expressed as a volume fraction of a column section, an averagely adsorbed constituent displaces in the first (n−1) sections in successive volumes of $(\epsilon b + Ca).V$; the $n^{th}$ section must therefore have a volume V' such that $(\epsilon b + Ca).V = (\epsilon b + Ca).V' + v$ to retain the same traverse time θ, i.e., $V' = V - v/(\epsilon b + Ca)$. Finally, a strongly adsorbed constituent, displaced by a less adsorbed eluent than itself, displaces in the first (n−1) sections in successive volumes $(\epsilon b + k. Ca).V$, where k>1; for practical reasons, we consider that it comes into contact in the (n−1) first sections with a maximum of successive volumes V and thus the $n^{th}$ section has a volume $V' = V - v$ in order for the traverse time θ to be maintained for the strongly adsorbed constituent.

In general, in a first variation, the $n^{th}$ section has volume V', such that $V - v > V' > V - v/\epsilon b$. In this way, the vast majority of the perturbations will be eliminated; however, residual perturbations will persist singe the conjunction of a reduced fixed bed and a dead volume, even with under pressurized flow, is not equivalent to a fixed bed of normal size.

In a second variation, the fluid mixture can be a pressurized gas or a less dense supercritical fluid. In this case, it is driven by one (or more) flow rate regulated recycling compressor(s). The correcting term can then be attenuated by multiplying it by the ratio of the densities of the fluid phase df and the adsorbed phase da.

More generally, if as is often the case a flow rate regulated recycling pump and one or more pressure controlled recycling pumps are used, the problem of two or more anisotropies of volume is resolved in the same way, by reducing the volume of the fixed bed located at the inlet (or outlet) of the recycling pump using the rule defined above.

While the main cause of introduction of dead volumes in a simulated mobile bed chromatographic apparatus is the recycling pump(s), the introduction of other apparatus between two particular columns will produce the same effects: some measuring or sampling apparatus can be mentioned such as a flow meter, a spectrometer cell to measure the composition on-line, a by-pass or a sampling circuit. Each particular anisotropy, thus each dead volume caused by the introduction of a particular apparatus, can be compensated for by reducing the volume of the fixed bed which is solid with such an apparatus according to the relationship $$V' = V - v_j/\epsilon,$$

where V' is the corrected volume for a section which is solid with the dead volume, V is the volume of a section (and its connection to the following section) which does not comprise an additional dead volume in the circuit, $v_j$ represents the dead volume of a pump or measuring apparatus, and $\epsilon$ represents a coefficient between 1 and $\epsilon b$ which represents the total of the intergrain (bed) and grain porosities, expressed as a volume fraction of a column or column section. When the fluid mixture is a pressurized gas or a less dense supercritical fluid, it is driven by one (or more) compressor(s), and the correcting term must be attenuated by multiplying it by the ratio of the density of the fluid phase df and the adsorbed phase da.

FIGS. 2A, 2B and 2C represent the operation of a simulated counter-current apparatus where the liquid and the commutation displacement displace in the same sense (clockwise). The apparatus comprises 24 columns connected together, column 24 (n) and column 1 being connected via a fixed recycling pump P. Zone 1 is delimited by the eluent injection point S and extract extraction point EA, zone 2 by the extract extraction point and the feed injection point A+B, zone 3 by the feed injection point A+B and the raffinate extraction point RB, and zone 4 by the raffinate extraction point and the eluent injection point. At the end of each period, the injection and extraction streams are shifted.

Figure 3:
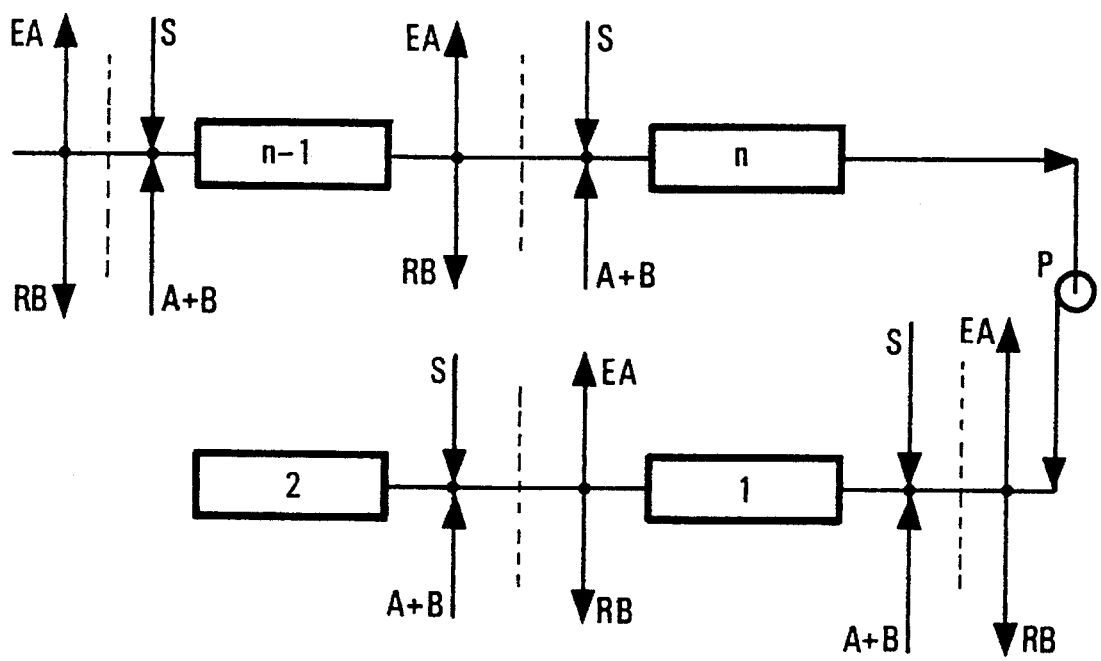
FIG. 3 shows a simulated mobile bed where the recycling pump is fixed to the $n^{th}$ bed or column section.

FIG. 3 shows a variation in the succession of column sections n, extract extraction EA, raffinate extraction RB, feed injection A+B and eluent injection S between two sections. Further, this figure shows the recycling pump and/or measuring means located immediately upstream of the extract extraction stream EA or raffinate extraction stream RB, these latter being located upstream of bed 1. In this case, the volume of the $n^{th}$ section must be corrected to re-establish isochronicity of the displacement of the point defined above with respect to the injection and extraction points.

Two other situations are possible:

In one variation which is not illustrated, the extraction streams from the $n^{th}$ bed and those for injection into the first bed are between the $n^{th}$ bed and the recycling pump: in this case, the volume of the first bed must be corrected rather than that of the $n^{th}$ and last.

In a further variation which is not illustrated, the extraction streams from the $n^{th}$ bed are between the $n^{th}$ bed and the recycling pump, while the injection points into the first bed are between the recycling pump and the first bed: this situation should not be allowed: in this case, in order to retain isochronicity with respect to the extraction points, the first bed would have to be shortened, while in order to retain isochronicity with respect to the injection points, the $n^{th}$ bed would have to be shortened.

Finally, if the extraction streams for the $n^{th}$ bed and the injection streams for the first bed are placed between two distinct dead volumes or two anisotropies, for example the recycling pump or compressor and a measuring apparatus or between the recycling pump and a line which is longer than the others, the situation arises where the $n^{th}$ bed must be shortened as a function of the dead volume of the recycling pump or compressor and the first bed as a finction of the dead volume of the measuring apparatus or the dead volume resulting from the line which is longer than the others.

In the case of a simulated mobile bed with a constant recycle flow rate as described in French patent application 94/05293, since the perturbation produced by the introduction of one or more dead volumes in the recycling circuit is equivalent to that observed for the equivalent conventional simulated mobile bed, the correction provided by the reduction in the volume of the bed preceding the anisotropy is also equivalent. The rules for correction described above can thus be applied in exactly the same manner to a simulated mobile bed with a constant recycle flow rate as for the equivalent conventional simulated mobile bed.

The following example illustrates the invention without limiting its scope. FIG. 5 shows the composition of the extract period by period without any compensation. FIG. 6 shows the same diagram when compensation is effected by reducing the length of the $n^{th}$ segment in the column.

EXAMPLE 1A (comparative)

In accordance with the prior art, a feed with the following composition was separated: ethylbenzene (EB) 12.07% para-xylene (PX) 22.95% ortho-plus meta-xylene (OX+ MX) 64.98%. The unit consisted of 24 columns of 1 m in length and 1 cm diameter, operated as a simulated mobile bed in counter-current mode. The lines and pump intercalated between columns 24 and 1 created a dead volume of 17.25cm$^3$. The respective flow rates of the feed, the eluent constituted by substantially pure toluene, the extract and the raffinate were 1.42 cm$^3$/min, 2.45 cm$^3$/min, 2.05 cm$^3$/min and 1.82 cm$^3$/min. The adsorbent was a barium and potassium exchanged Y zeolite such as SPX 2000 from CECA (France). The columns were divided as follows: 5 in zone 4, 4 in zone 3, 7 in zone 2, 8 in zone 1. The recycling pump flow rates were as follows: 5 times in zone 4, 9.1 cm$^3$/min, 4 times in zone 3, 10.92 cm$^3$/min, 7 times in zone 2, 9.5 cm$^3$/min and 8 times in zone 1, 11.55 cm$^3$/min. The shift period was five minutes. During the first period of the cycle, the eluent was injected into the inlet to column 1, the extract was removed from the outlet to column 8, the feed was injected into the inlet to column 16 and the raffinate was removed from the outlet to column 19. The average purity obtained for the para-xylene in the extract was 90.70% and the yield was 99.90%. FIG. 5 shows that the compositions of the extract measured period by period were very variable.

EXAMPLE 1B

In accordance with the invention, with all the parameters remaining the same, the twenty-fourth column was replaced with a 62.5 cm long column. The yield obtained was 99.75% for para-xylene in the extract while the purity obtained this time was 96.26%. FIG. 6 shows that the compositions of the extract taken period by period remained very close to each other: the maximum difference was divided by 5. It can thus be seen that a very simple correction, namely shortening the 24$^{th}$ bed, removed more than 80% of perturbations in the composition caused by the dead volume of the recycling pump, the volume V', i.e. 62.5 cm 0.5 cm 0.5 cm.π=49.09 cm$^3$, was between V−v/ϵm i.e., 48.76 cm$^3$ and V−v, i.e., 61.25 cm$^3$, where ϵb=0.58, i.e., 0.33 for the bed porosity and 0.25 for the grain porosity.

EXAMPLE 1C

In addition to the recycling pump between the first and 24$^{th}$ bed, a spectrophotometer was intercalated between the 12$^{th}$ and 13$^{th}$ beds, with a dead volume of 8 cm$^3$, the 8 cm$^3$ being considered to be solid with column 12, as with the pump of FIG. 3. In order to compensate for the perturbations in the extract and raffinate composition caused by these dead volumes, the 24$^{th}$ column was replaced by a 62.5 cm long column, as explained with respect to Example 1B, and the 12$^{th}$ was replaced by a 82.5 cm long column.

We claim:

1. A process for the simulated mobile bed separation of a feed (A+B) containing at least two constituents in the presence of at least one eluent (S) into at least two fractions, comprising n, advantageously 4 to 24, chromatographic columns or column sections mounted in series and in a closed circuit, in which a liquid, supercritical or gaseous mixture circulates under pressure, the circuit having at least one feed injection stream, at least one eluent injection stream, at least one extract extraction stream (EA) and at least one raffinate extraction stream (RB), at least four zones being determined in said columns, each zone being separated from the following zone by an injection or extraction stream, the injection and extraction streams being periodically shifted, the closed circuit comprising a recycling pump (P) for said mixture, which is flow rate regulated and located between two successive columns or column sections, optionally at least one measuring or sampling means and optionally at least one recycling pump which is pressure regulated, said measuring or sampling means and/or the pressure regulated recycling pump each being located between two consecutive columns or column sections, said pumps and/or measuring or sampling means each having a dead volume in the recycling circuit which causes perturbations in the extract and in the raffinate composition, the process comprising the volume of the section immediately upstream of said dead volume is reduced by a compensating value when the dead volume is located downstream of said section and upstream of the extraction streams of said section, or the volume of the section immediately downstream of said dead volume is reduced by a compensating value when said dead volume is located downstream of the injection streams into said section and upstream of said section.

2. A process according to claim 1, in which said mixture is liquid or supercritical and in which the volume of each section immediately upstream or immediately downstream of each dead volume $v_j$ of the circuit is reduced accordance with the relationship $$V'_j = V - v_j/\epsilon$$

where V represents the individual void volume of a section and its connection to the following section, V' represents the individual void volume of a section with reduced volume in accordance with the invention and its connection to the following section, $v_j$ represents the dead volume(s) whose effects are to be corrected, ϵ represents a coefficient between ϵb and 1, where ϵb is expressed as the volume fraction of a column or column section and represents the total of the intergrain and grain porosities in said column or column section.

3. A process according to claim 2, in which the circuit comprises at least two distinct dead volumes between two successive sections, the extraction streams and the injection streams being between the distinct volumes, and in which the volume of each of the two sections is reduced as a function of the relationships defined in claim 2.

4. A process according to claim 1, in which said mixture is a pressurized gas or a less dense supercritical fluid, and one or more recycling compressors are used in place of the recycling pump(s), and the volume of each section immediately upstream or immediately downstream of each dead volume $v_j$ of the circuit is reduced in accordance with the relationship $$V'_j = V - df \cdot v_j / da \cdot \epsilon$$

where $v'_j$, V, $v_j$ and ϵ are the parameters of claim 2 and where df is the density of the fluid phase and da is the density of the adsorbed phase.

5. A process according to claim 1, in which the simulated mobile bed is in counter-current mode.

6. A process according to any one of claim 1, in which the simulated mobile bed is in co-current mode.

7. A process according to claim 1, in which the simulated mobile bed is operated with a constant recycle flow rate.

8. A process according to claim 1, in which the feed comprises a mixture of aromatic hydrocarbons containing 8 carbon atoms.

* * * * *